United States Patent Office 3,092,504
Patented June 4, 1963

3,092,504
THERMOPLASTIC PRECIOUS METAL DECORATING COMPOSITIONS
Robert C. Langley, Millington, and David B. Kellam, Nutley, N.J., assignors, by mesne assignments, to Engelhard Industries, Inc., Newark, N.J., a corporation of Delaware
No Drawing. Filed Mar. 11, 1960, Ser. No. 14,168
23 Claims. (Cl. 106—1)

This invention relates to precious metal decorating compositions, and, more particularly, relates to new precious metal decorating compositions which are thermoplastic, i.e., they are solid at room temperature but fluid at moderately elevated temperatures of the order of 120° F. to 240° F. These precious metal decorating compositions are suitable for application, while at such moderately elevated temperatures, to glass, quartz, glazed ceramics, unglazed ceramics, Pyroceram, mica, stainless steel, aluminum, titanium and other refractory substrates. Immediately upon application to such substrates, these thermoplastic precious metal compositions freeze to hard, tack-free films, having the advantages of ease of handling without smearing, freedom from defects due to settling dust and permitting immediate subsequent application of other decorating compositions. Upon firing the refractory substrates to temperatures between 750° F. and 2100° F., adherent precious metal films result. These films are useful for their decorative appeal, for their ability to conduct electricity, to transmit particular wavelengths of ultraviolet and visible light, to reflect infra-red and other energy, as bases for soldering and for other purposes.

As "liquid bright gold," precious metal decorating compositions have been known for many years. In Boudnikoff, Comp. rend. 196, 1898–9 (1933) a method is described for making a gold compound from sulfurized Venetian turpentine. This gold compound is dissolved in essential oils, such as oil of lavender, oil of rosemary and aniseseed oil, and when gold fluxes, such as rhodium resinate, bismuth resinate and chromium resinate have been added to the solution in the proper proportions, a decorating composition known as "liquid bright gold" results. The gold compound made in this way is referred to in the art as gold resinate.

Another type of gold resinate used in making liquid bright gold is described in U.S. Patent No. 2,490,399, granted to H. K. Ballard. This type of gold resinate is referred to as a terpene mercaptan gold resinate or simply as gold terpene mercaptide. Still another class of liquid bright golds contain gold tertiary alkyl mercaptides as described in copending application Serial No. 727,254, filed April 9, 1958, now Patent No. 2,984,574.

Decorating compositions containing platinum for use on glass and ceramics are known in the art and have been described by Chemnitius, Sprechsaal 60, 226 (1927); C.A. 24, 4909. Such compositions contain a platinum resinate prepared by causing a platinum salt to react with a sulfurized terpene such as sulfurized Venetian turpentine. The platinum resinate is dissolved in vehicle such as oils of lavender, rosemary, aniseseed, sassafras, wintergreen and fennel, turpentine, various terpenes, nitrobenzene and the like and is mixed with fluxes such as salts and resinates of rhodium, chromium, bismuth, lead, cadmium, tin, copper, cobalt, antimony and uranium and with resins such as Assyrian asphalt and various rosins to form decorating compositions. Such compositions are known as liquid bright platinums.

It is well known in the art that a palladium compound may be prepared in the same manner as the above-mentioned platinum resinate. Decorating compositions made from a palladium resinate are known as liquid bright palladiums.

It will be seen from the above that the liquid bright precious metal decorating compositions comprise solutions of organic precious metal compounds in organic solvents. Soluble fluxes are ordinarily included in such compositions, and compositions including fluxes are preferred, although for a few limited applications, such as for application over a previously fluxed substrate, such fluxes are not essential.

Thermosetting precious metal decorating compositions are known and are described in U.S. Patent No. 2,842,457, granted to J. E. Morgan and C. W. Wagner. These thermosetting compositions are made by dissolving gold resinate or terpene mercaptan gold resinate and suitable gold fluxes in a solvent mixture which also dissolves a certain thermosetting epoxy resin and a certain catalyst for this epoxy resin. These thermosetting gold compositions are fluid at room temperature; they are applied at room temperature to refractory substrates and upon subsequent heating to temperatures between 167° F. and 392° F., set to hard solid films.

The thermoplastic precious metal decorating compositions of this invention differ from the thermosetting compositions of the prior art in that the thermoplastic precious metal decorating compositions of this invention are solids at room temperature and are heated to moderately elevated temperatures before application to refractory substrates. The thermoplastic precious metal decorating compositions of this invention set to hard solid films immediately upon contacting refractory substrates which are at room temperature.

The thermoplastic precious metal decorating compositions of this invention have an advantage over all precious metal decorating compositions of the prior art in that the thermoplastic precious metal decorating compositions of this invention can be handled immediately after application to a substrate without any necessity for an intermediate drying operation. This property of immediate hardening on application to a substrate eliminates costly drying equipment, permits faster production of decorated objects, eliminates the rejects due to smears experienced with conventional precious metal decorating compositions and permits unusual decorative effects not obtainable with conventional precious metal decorating compositions. An example of such a decorative effect obtainable only with the thermoplastic precious metal decorating compositions of this invention is a "wraparound" design screen printed on a round object such as a glass cylinder. When a thermoplastic precious metal decorating composition such as a thermoplastic liquid bright gold is maintained in a screen stencil at a moderately elevated temperature such as 150° F., it can be applied in a "wraparound" design to a round object, such as a glass cylinder, which is maintained at 75° F., by rotating the glass cylinder while in contact with the screen stencil through more than 360 degrees relative to a fixed point on its periphery. This gives a design which overlaps without smearing; the thermoplastic precious metal composition sets to a hard film immediately upon contact with the glass cylinder and does not smear when, after the glass cylinder rotates through more than 360 degrees, the thermoplastic precious metal composition again comes in contact with the screen stencil. While conventional precious metal decorating compositions are commonly applied to round objects such as glass cylinders by the screen stencil method, "wraparound" designs are not possible without smearing since rotation of the decorated object through more than 360 degrees brings a wet design into contact with the screen stencil. Thus conventional precious metal decorating compositions for round objects are limited to use in designs which cover less than 360 degrees of the periphery of such objects. Conventional precious metal decorating compositions for application by brushing or spraying are subject to defects caused by dust settling on the wet film after application and prior to firing. Dust causes unsightly voids in the fired film. The thermoplastic precious metal decorating compositions of this invention eliminates defects due to dust by forming hard, tack-free films to which dust cannot adhere, immediately upon application to the substrate.

Thermoplastic ceramic colors have been known for many years and are fully described in U.S. Patents No. 2,682,480 issued to R. Andrews; No. 2,842,454 to O. A. Short; No. 2,607,701 and No. 2,607,702 to C. C. Jessen, and No. 2,748,093 to W. C. Morris. These and other patents describe suspensions of inorganic colors, also known in the art as glass enamels, in various waxes, resins, plasticizers and solvents, such as "Carbowax" 4000, "Abalyn," "Armeen" 18D stearamide, "Acryloid" SF 100, "Armid" HT, "Staybelite," stearic acid, limed wood rosin, "Aeroplaz" 905, Pliolite R-108, paraffin wax, stearyl alcohol, carnauba wax, aluminum stearate, phosphorated tall oil, bayberry wax, natural vegetable wax, "Polypale" resin, lecithin, stearyl acid phosphate, various polyethylene glycols, diphenyl, various esters of hydrogenated rosin, and polybutene. From this prior art relating to ceramic colors, it is apparent that precise mixtures of the above named and other thermoplastic materials are necessary in making thermoplastic ceramic colors which will have desirable properties in use. These thermoplastic ceramic colors are commonly used in applying decorative films on glass; they are applied by the screen stencil technique, usually with a screen heated electrically to soften the thermoplastic for printing. The use of such thermoplastic ceramic colors permits overprinting with successive colors immediately and eliminates the need for any intermediate drying before overprinting.

The thermoplastic precious metal decorating compositions of this invention differ from the thermoplastic ceramic colors of the prior art in that the latter do not contain organic precious metal compounds nor are they solutions but rather suspensions of inert inorganic solids in thermoplastic vehicles. When fired on glossy or glazed substrates, the precious metal decorating compositions of this invention yield specular, electrically conductive metallic films. The fired films obtained from thermoplastic ceramic colors are non-specular mixtures of oxides, not electrically conductive.

The thermoplastic precious metal decorating compositions of this invention can be made by substituting a wax or waxlike substance for part of the solvent normally present in conventional precious metal decorating compositions. Such wax or waxlike substance may be present in the finished composition in the amount of from about 20 percent to about 80 percent by weight, depending on the particular wax used, the method of application and the degree of hardness sought in the film upon application. These compositions melt in the range of 125° F. to 215° F. Examples of such waxes are the Armids, which are primary amides of fatty acids. Armid HT, melting point 208° F., Armid C, M.P. 174° F., and Armid O, M.P. 154° F., have been found to be very suitable in thermoplastic precious metal formulations. Other waxes found to be useful are Rosin Amine D stearate and Rosin Amine D 2-ethyl hexoate.

Instead of a wax or waxlike substance, a thermoplastic resin can be used to make a thermoplastic precious metal decorating composition. An example of such thermoplastic resin is Staybelite Resin, a hydrogenated rosin described in the booklet, "Staybelite Resin," published in 1946. Thermoplastic resins may be present in the finished composition in the amount of from about 20 percent to about 90 percent by weight, giving precious metal decorating compositions which melt at somewhat higher temperatures, such as 200 to 240° F., than those made with waxes. Other thermoplastic resins found to be useful are Staybelite Ester No. 1, the ethylene glycol ester of hydrogenated rosin, Staybelite Ester No. 2, the diethylene glycol ester of hydrogenated rosin, the rosin Amine D salt of naphthenic acid, and an acrylic resin available commercially as Catalin Resin A-1114.

By using both a wax and a thermoplastic resin in varying proportions in a thermoplastic precious metal decorating composition, it is possible to vary the viscosity of the composition to suit different conditions or methods of application and to allow for variations in temperature of the substrate to be decorated. Suitable mixtures of thermoplastic resins and waxes are available commercially, such as "Drakotherm #712" and "Drakotherm #744," both melting at about 140° F. These compositions include a thermoplastic resin, a thermoplastic wax, a plasticizer and a solvent, and leave no ash or residue on firing. The range of total thermoplastic component is preferably 40 to 70 percent by weight of the formulation. It has also been found that the addition of certain organic solids to thermoplastic precious metal decorating solutions is useful in controlling their viscosity. These organic solid additives are selected for their insolubility in the precious metal decorating composition, for their stability at moderate temperatures, such as 125° F. to 240° F., and for their quality of volatilizing at temperatures above 240° F. without effect on the precious metal film. Examples of such thermally fugitive organic fillers are finely divided urea or melamine.

The invention will be further illustrated by reference to the following specific examples:

*Example I*

A thermoplastic liquid bright gold made with a mixture of waxes, resins, plasticizers and solvents was prepared as follows:

| | Parts by weight |
|---|---|
| Gold resinate dissolved in a mixture of essential oils (24 percent Au) | 400 |
| Rhodium resinate dissolved in a mixture of essential oils and hydrocarbons (2 percent Rh) | 25 |
| Bismuth resinate dissolved in a mixture of essential oils (9 percent Bi) | 35 |
| Chromium resinate dissolved in a mixture of cyclohexanone and oil of turpentine (2.05 percent Cr) | 20 |
| Drakotherm #712 | 296 |
| | 776 |
| This mixture was evaporated with stirring on a steam bath to | 560 |

A dark, clear solution when at a temperature of 125° F. and above, resulted. This set to a hard, wax-like solid on cooling to room temperature. The solution contained approximately 17 percent Au, 0.09 percent Rh, 0.56 percent Bi, and 0.073 percent Cr. When applied to a round glass object by a stainless steel screen heated electrically to 125° F. to 140° F., a hard, waxy film formed immediately upon contact with the glass object which was at 75° F. When this glass object was fired to a temperature of approximately 1100° F., an adherent gold film of mat appearance resulted. This film was an excellent conductor of electricity.

*Example II*

A thermoplastic liquid bright gold which fires out brighter than Example I was prepared as follows:

To 560 parts by weight of the mixture of Example I after evaporation was added 260 parts by weight of the Rosin Amine D salt of naphthenic acid. Rosin Amine D is a primary amine made from a modified rosin. It is fully described in the booklet "Rosin Amine D and Its Derivatives," published in 1950. Rosin Amine D has an approximate molecular weight of 318 and when reacted by warming with a naphthenic acid of approximately molecular weight of 252, in the proportion of one mole of the amine to one mole of the acid, a thermoplastic compound results. This Rosin Amine D salt of naphthenic acid is a clear yellow solid at room temperature, but changes to a fluid when warmed to approximately 175° F.

The addition of 260 parts by weight of the Rosin Amine D salt of naphthenic acid to 560 parts by weight of Example I resulted in a product which was a clear dark solution when warmed by an infra-red source to a temperature of 125° F. to 140° F. While warmed in this manner, the solution was stenciled through a silk screen on to a round glass object maintained at 75° F. Immediately upon contact with the glass, the solution of liquid bright gold set to a hard, waxy film. When the glass object was fired to approximately 1100° F., an adherent decorative bright gold film resulted.

*Example III*

A thermoplastic liquid bright gold suitable for overprinting with a ceramic color was prepared as follows:

|  | Parts by weight |
|---|---|
| Gold resinate dissolved in a mixture of essential oils (24 percent Au) | 664 |
| Rhodium resinate dissolved in a mixture of essential oils and hydrocarbons (2 percent Rh) | 44.7 |
| Bismuth resinate dissolved in a mixture of essential oils (9 percent Bi) | 58.1 |
| Chromium resinate dissolved in a mixture of cyclohexanone and oil of turpentine (2.05 percent Cr) | 33.2 |
| Drakotherm #712 | 600 |
| Rosin Amine D salt of naphthenic acid | 450 |
| Finely divided melamine powder | 810 |
|  | 2660 |

This mixture was evaporated with stirring on a steam bath to ____ 2300

The mixture contained approximately 7 percent Au and when warmed to approximately 140° F. on an electrically heated stainless steel screen, printed sharply on to a round glass bottle maintained at 75° F. The print on the bottle was hard and tack-free immediately after printing and was overprinted with a ceramic color suspended in squeegee oil, a mixture well known in the art as squeegee glass enamel. This overprinting was accomplished without smearing or detracting from the gold print in any way. When fired to approximately 1100° F., an appealing design of adherent bright gold overprinted with adherent glass enamel resulted. The finely divided melamine powder in this example serves as an inert organic diluent which volatilizes during firing without affecting the fired appearance of the bright gold.

*Example IV*

Example III was repeated, substituting for gold resinate, a 24 percent Au solution of gold pinene mercaptide, prepared as described in Example I of U.S. Patent No. 2,490,399. The printing properties and fired appearance of Example III were duplicated in every way with the substituted gold pinene mercaptide.

*Example V*

Example III was repeated, substituting for gold resinate, a 24 percent Au solution of gold tertiary dodecyl mercaptide, prepared as described in Example 7b of copending application Serial Number 727,254, of Howard M. Fitch. The printing properties and fired appearance of Example III were duplicated in every way with the substituted gold tertiary dodecyl mercaptide.

*Example VI*

A thermoplastic liquid bright gold comprising only liquid bright gold and a wax was prepared as follows:

|  | Parts by weight |
|---|---|
| Gold tertiary dodecyl mercaptide dissolved in a mixture of essential oils (24 percent Au) | 75 |
| Rhodium resinate dissolved in a mixture of essential oils (2 percent Rh) | 5 |
| Armid HT | 105 |
|  | 185 |

This mixture was evaporated with stirring on a steam bath to ____ 150

Armid HT is a synthetic wax and is composed of amides of hexadecane, octadecane and octadecene, m.p. about 208° F. After evaporation, the dark brown solution contained 70 percent Armid HT, 12 percent Au and 0.066 percent Rh, and was fluid at 215° F. and above. When warmed to 240° F., the solution was transferred by means of a brush to a glass cylinder. Immediately upon contact with the glass, the solution set to a hard, waxy solid. Upon subsequent firing to 1100° F., a bright electrically conductive gold film resulted.

*Example VII*

A thermoplastic liquid bright gold suitable for screening and melting at approximately 200° F. was prepared as follows:

|  | Parts by weight |
|---|---|
| Gold resinate dissolved in a mixture of essential oils (24 percent Au) | 664 |
| Rhodium resinate dissolved in a mixture of essential oils and hydrocarbons (2 percent Rh) | 44.7 |
| Bismuth resinate dissolved in a mixture of essential oils (9 percent Bi) | 58.1 |
| Chromium resinate dissolved in a mixture of cyclohexanone and oil of turpentine (2.05 percent Cr) | 33.2 |
| Armid HT | 600 |
| Rosin Amine D salt of naphthenic acid | 450 |
| Finely divided melamine powder | 461 |
|  | 2311.0 |

This mixture was evaporated with stirring on a steam bath to ____ 1971

The mixture contained approximately 8.1 percent Au, 0.045 percent Rh, 0.26 percent Bi and 0.034 percent Cr, and when warmed to approximately 200° F. on an electrically heated stainless steel screen, printed sharply on to a round glass bottle maintained at 100° F. The print on the bottle was hard and tack-free immediately after printing, and was overprinted with squeegee glass enamel without smearing. When the bottle was fired to 1100° F., an appealing design of adherent bright gold overprinted with adherent glass enamel resulted.

*Example VIII*

A thermoplastic liquid bright gold suitable for screening and melting at approximately 170° F. was prepared as follows:

| | Parts by weight |
|---|---|
| Gold resinate dissolved in a mixture of essential oils (24 percent Au) | 664 |
| Rhodium resinate dissolved in a mixture of essential oils and hydrocarbons (2 percent Rh) | 44.7 |
| Bismuth resinate dissolved in a mixture of essential oils (9 percent Bi) | 58.1 |
| Chromium resinate dissolved in a mixture of cyclohexanone and oil of turpentine (2.05 percent Cr) | 33.2 |
| Armid HT | 600 |
| Rosin Amine D salt of naphthenic acid | 450 |
| Stearic acid | 188 |
| Finely divided melamine powder | 461 |
| | 2,499.0 |
| This mixture was evaporated with stirring on a steam bath to | 2159 |

The mixture contained approximately 7.4 percent Au, 0.041 percent Rh, 0.24 percent Bi and 0.032 percent Cr, and when warmed to approximately 170° F. on an electrically heated stainless steel screen, printed sharply on to a round glass bottle maintained at 75° F. The print on the bottle was hard and tack-free immediately after printing and was overprinted with squeegee glass enamel without smearing. When the bottle was fired to 1100° F., an appealing design of adherent bright gold overprinted with adherent glass enamel resulted.

*Example IX*

Example VIII was repeated, substituting for gold resinate, a 24 percent solution of gold pinene mercaptide, prepared as described in Example I of U.S. Patent No. 2,490,399. The printing properties and fired appearance of Example VIII were duplicated in every way with the substituted gold pinene mercaptide.

*Example X*

Example VIII was repeated, substituting for gold resinate, a 24 percent solution of gold tertiary dodecyl mercaptide, prepared as described in Example 7b of copending application Serial No. 727,254, of Howard M. Fitch. The printing properties and fired appearance of Example VIII were duplicated in every way with the substituted gold tertiary dodecyl mercaptide.

*Example XI*

A thermoplastic liquid bright gold comprising only liquid bright gold and a thermoplastic resin was prepared as follows:

| | Parts by weight |
|---|---|
| Gold resinate dissolved in a mixture of essential oils (24 percent Au) | 400 |
| Rhodium resinate dissolved in a mixture of essential oils and hydrocarbons (2 percent Rh) | 25 |
| Bismuth resinate dissolved in a mixture of essential oils (9 percent Bi) | 35 |
| Chromium resinate dissolved in a mixture of cyclohexanone and oil of turpentine (2.05 percent Cr) | 20 |
| Stabelite Resin, a hydrogenated rosin described in the booklet "Staybelite Resin," published in 1946 | 300 |
| | 780 |
| This mixture was evaporated with stirring on a steam bath to | 600 | and then contained about 16 percent gold, 0.08 percent Rh, 0.53 percent Bi, and 0.068 percent Cr.

When placed in the metal well of a roller coating machine and heated by an infra-red source to approximately 220° F., the clear dark solution was applied to the edge of a glazed earthenware dinner plate. Almost immediately upon contact with the dinner plate, the gold solution set to a medium-hard film having very little tack. This film proved greatly superior to conventional liquid bright gold in its ability to resist smears caused by handling or imperfections due to dust settling on a wet film. When fired to 1375° F., an adherent bright gold film resulted.

*Example XII*

A thermoplastic liquid bright platinum was prepared as follows:

| | Parts by weight |
|---|---|
| Gold resinate dissolved in a mixture of essential oils (24 percent Au) | 100 |
| Platinum resinate dissolved in a mixture of essential oils (12 percent Pt) | 300 |
| Rhodium resinate dissolved in a mixture of essential oils and hydrocarbons (1 percent Rh) | 50 |
| Bismuth resinate dissolved in a mixture of essential oils (4.5 percent Bi) | 70 |
| Chromium resinate dissolved in a mixture of cyclohexanone and oil of turpentine (2.05 percent Cr) | 20 |
| Drakotherm #712 | 405 |
| Rosin Amine D salt of naphthenic acid | 300 |
| Finely divided melamine powder | 195 |
| | 1440 |
| The above mixture was evaporated with stirring on a steam bath to | 1200 |

This mixture contained 2 percent Au, 3 percent Pt, 0.04 percent Rh, 0.26 percent Bi, 0.034 percent Cr, and when warmed to approximately 140° F. on an electrically heated stainless steel screen, printed sharply on to a round glass bottle maintained at 75° F. The print on the bottle was hard and tack-free immediately after printing. When fired to approximately 1100° F., an adherent bright platinum film resulted. This bright platinum film had considerable decorative appeal, was electrically conductive and served as a base for the attachment of copper wires by solder.

A thermoplastic liquid bright palladium can be made by substituting palladium resinate solution for the platinum resinate solution of this example.

*Example XIII*

A thermoplastic luster color was produced as follows:

| | Parts by weight |
|---|---|
| Gold resinate dissolved in a mixture of essential oils (24 percent Au) | 100 |
| Titanium resinate dissolved in a mixture of essential oils and hydrocarbons (3.6 percent Ti) | 400 |
| Bismuth resinate dissolved in a mixture of essential oils (4.5 percent Bi) | 300 |
| Drakotherm #712 | 600 |
| Rosin Amine D salt of naphthenic acid | 450 |
| Finely divided melamine powder | 910 |
| | 2760 |
| The above mixture was evaporated with stirring on a steam bath to | 2400 |

The mixture then contained 1 percent Au, 0.6 percent Ti and 0.56 percent Bi. When warmed to approximately 150° F. on an electrically heated stainless steel screen, the mixture printed sharply on to a round glass bottle maintained at 75° F. The film on the bottle was hard and tack-free. When fired to 1100° F., an attractive adherent film resulted. This film was blue in transmitted light and had a high metallic sheen when viewed in reflected light. This mixture was placed in a glass container and warmed to approximately 170° F., then transferred by means of a camel's hair brush to an earthenware dinner plate maintained at 75° F. The brushed film set almost immediately to a hard, tack-free film. When fired to 1375° F., an adherent, highly iridescent blue luster decoration resulted.

*Example XIV*

A thermoplastic mat gold was produced as follows:

| | Parts by weight |
|---|---|
| Gold resinate dissolved in a mixture of essential oils (24 percent Au) | 400 |
| Rhodium resinate dissolved in a mixture of essential oils and hydrocarbons (1 percent Rh) | 50 |
| Bismuth resinate dissolved in a mixture of essential oils (4.5 percent Bi) | 70 |
| Chromium resinate dissolved in a mixture of cyclohexanone and oil of turpentine (2.05 percent Cr) | 20 |
| Drakotherm #712 | 600 |
| Rosin Amine D salt of naphthenic acid | 200 |
| Finely divided melamine powder | 400 |
| | 1740 |
| This mixture was evaporated with stirring on a steam bath to | 1400 |

The mixture then contained approximately 6.9 percent Au, 0.04 percent Rh, 0.23 percent Bi, and 0.029 percent Cr. The above mixture was spread in a thin film on a flat steel plate maintained at 170° F. When transferred by means of a rubber stamp to an earthenware dinner plate maintained at 75° F., the mixture set almost immediately to a hard, tack-free film. Upon firing to 1375° F., an attractive mat gold decoration resulted.

It will be apparent from the above examples that variations in the formulations are possible depending on the method of application used and the use for which the unfired or fired film is intended. For example, with heated spraying equipment, it would be possible to spray a liquid bright gold formulation which would set immediately upon contacting an object at room temperature, thus eliminating the problem of dust settling on the wet film encountered with conventional liquid bright golds.

It will be obvious to those skilled in the art that many modifications may be made within the scope of the present invention without departing from the spirit thereof, and the invention includes all such modifications.

What is claimed is:

1. A thermoplastic precious metal decorating composition comprising a soluble organic precious metal compound and a thermoplastic medium as an organic solvent therefor, said composition being proportioned to be solid at normal temperature and meltable at a temperature within the range of 120° F. to 240° F. to prepare the composition for application to the surface to be decorated, the composition solidifying substantially immediately upon contact with the surface to form a hard tack-free film thereon.

2. A precious metal decorating method which comprises applying as a liquid to a refractory substrate maintained substantially at room temperature a thermoplastic precious metal composition comprising a soluble organic precious metal compound and a thermoplastic medium as an organic solvent therefor, said composition being proportioned to be solid at normal temperature and meltable at a temperature within the range of 120° F. to 240° F. to prepare the composition for application to the substrate to be decorated, the composition solidifying substantially immediately upon contact with the substrate to form a hard tack-free film thereon, maintained liquid by heating at an elevated temperature above its melting point, a hard, tack-free film being formed substantially immediately upon contact of the composition with the refractory substrate.

3. A liquid bright gold decorating method, which comprises applying as a liquid to a refractory substrate maintained substantially at room temperature a thermoplastic liquid bright gold composition comprising a soluble liquid bright gold and as an organic solvent for the liquid bright gold, a thermoplastic medium selected from the group consisting of thermoplastic resins, thermoplastic waxes and mixtures thereof, the thermoplastic medium constituting from about 20 percent to about 80 percent by weight of the composition, the thermoplastic bright gold composition having a melting point within the range of 125° F. to 240° F., maintained liquid by heating at an elevated temperature above its melting point, a hard, tack-free film being formed substantially immediately upon contact of the composition with the refractory substrate.

4. A thermoplastic, normally solid precious metal decorating composition comprising a soluble organic precious metal compound, and as an organic solvent for the compound, a thermoplastic medium selected from the group consisting of thermoplastic resins, thermoplastic waxes and mixtures thereof, said thermoplastic medium constituting from about 20 percent to about 80 percent by weight of the composition, the thermoplastic precious metal composition having a melting point within the range of 125° F. to 240° F.

5. A thermoplastic, normally solid precious metal decorating composition comprising a soluble organic precious metal compound, a soluble flux for the precious metal, and as an organic solvent for the compound and flux, a thermoplastic medium selected from the group consisting of thermoplastic resins, thermoplastic waxes and mixtures thereof, said thermoplastic medium constituting from about 20 percent to about 80 percent by weight of the composition, the thermoplastic precious metal composition having a melting point within the range of 125° F. to 240° F.

6. A method of making a thermoplastic organic precious metal composition comprising a soluble organic precious metal compound, and a thermoplastic medium as an organic solvent therefor, which comprises, liquefying the thermoplastic medium by heating, and dissolving the organic precious metal compound in the liquefied thermoplastic medium present in amount sufficient to constitute from about 20 percent to about 80 percent by weight of the product thermoplastic organic precious metal composition, the product thermoplastic precious metal composition having a melting point within the range of 125° F. to 240° F.

7. A thermoplastic, normally solid precious metal decorating composition comprising a soluble organic precious metal salt, a soluble flux for the precious metal, and as an organic solvent for the salt and flux, a thermoplastic medium selected from the group consisting of thermoplastic resins, thermoplastic waxes and mixtures thereof, said thermoplastic medium constituting from about 20 percent to about 80 percent by weight of the composition, the thermoplastic precious metal composition having a melting point within the range of 125° F. to 240° F.

8. A composition according to claim 4 further characterized by containing a thermally fugitive organic filler.

9. A composition according to claim 4, in which the precious metal compound is a precious metal resinate.

10. A composition according to claim 4, in which the precious metal compound is a precious metal mercaptide.

11. A composition according to claim 4, in which the precious metal compound is a gold resinate.

12. A composition according to claim 4, in which the precious metal compound is a platinum resinate.

13. A composition according to claim 4, in which the precious metal compound is a palladium resinate.

14. A composition according to claim 4, in which the precious metal compound is a gold terpene mercaptide.

15. A composition according to claim 4, in which the precious metal compound is a gold tertiary alkyl mercaptide.

16. A thermoplastic bright gold composition comprising a solution of a gold resinate and a gold flux in a wax and a thermoplastic resin, in admixture with a thermally fugitive organic filler, the wax and thermoplastic resin together constituting from about 20 percent to about 80 percent by weight of the composition, the thermoplastic bright gold composition having a melting point within the range of 125° F. to 240° F.

17. A thermoplastic bright gold composition comprising a solution of a gold terpene mercaptide and a gold flux in a wax and a thermoplastic resin, in admixture with a thermally fugitive organic filler, the wax and thermoplastic resin together constituting from about 20 percent to about 80 percent by weight of the composition, the thermoplastic bright gold composition having a melting point within the range of 125° F. to 240° F.

18. A thermoplastic bright gold composition comprising a solution of a gold pinene mercaptide and a gold flux in a wax and a thermoplastic resin, in admixture with a thermally fugitive organic filler, the wax and thermoplastic resin together constituting from about 20 percent to about 80 percent by weight of the composition, the thermoplastic bright gold composition having a melting point within the range of 125° F. to 240° F.

19. A thermoplastic bright gold composition comprising a solution of a gold tertiary mercaptide and a gold flux in a wax and a thermoplastic resin, in admixture with a thermally fugitive organic filler, the wax and thermoplastic resin together constituting from about 20 percent to about 80 percent by weight of the composition, the thermoplastic bright gold composition having a melting point within the range of 125° F. to 240° F.

20. A thermoplastic bright gold composition comprising a solution of a gold tertiary alkyl mercaptide and a gold flux in a wax and a thermoplastic resin, in admixture with a thermally fugitive organic filler, the wax and thermoplastic resin together constituting from about 20 percent to about 80 percent by weight of the composition, the thermoplastic bright gold composition having a melting point within the range of 125° F. to 240° F.

21. A thermoplastic bright gold composition comprising a solution of a gold tertiary dodecyl mercaptide and a gold flux in a wax and a thermoplastic resin, in admixture with a thermally fugitive organic filler, the wax and thermoplastic resin together constituting from about 20 percent to about 80 percent by weight of the composition, the thermoplastic bright gold composition having a melting point within the range of 125° F. to 240° F.

22. A thermoplastic bright platinum composition comprising a solution of a gold resinate, a platinum resinate and a flux in a wax and a thermoplastic resin, in admixture with a thermally fugitive organic filler, the wax and thermoplastic resin together constituting from about 20 percent to about 80 percent by weight of the composition, the thermoplastic bright platinum composition having a melting point within the range of 125° F. to 240° F.

23. A thermoplastic bright platinum composition comprising a solution of a platinum resinate and a flux in a wax and a thermoplastic resin, in admixture with a thermally fugitive organic filler, the wax and thermoplastic resin together constituting from about 20 percent to about 80 percent by weight of the composition, the thermoplastic bright platinum composition having a melting point within the range of 125° F. to 240° F.

References Cited in the file of this patent
UNITED STATES PATENTS

| | | |
|---|---|---|
| 2,682,480 | Andrews | June 29, 1954 |
| 2,807,555 | Short | Sept. 24, 1957 |
| 2,842,454 | Short | July 8, 1958 |
| 2,842,457 | Morgan et al. | July 8, 1958 |
| 2,965,509 | Hoffman | Dec. 20, 1960 |